United States Patent
Kamini et al.

(10) Patent No.: US 10,529,104 B2
(45) Date of Patent: Jan. 7, 2020

(54) VIRTUAL VEHICLE SKIN

(71) Applicant: GM GLOBAL TECHNOLOGY OPERATIONS LLC, Detroit, MI (US)

(72) Inventors: Aditya S. Kamini, Bloomfield Hills, MI (US); Richard Elswick, Warren, MI (US); Nathaniel H. Williams, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/847,337

(22) Filed: Dec. 19, 2017

(65) Prior Publication Data

US 2019/0188891 A1 Jun. 20, 2019

(51) Int. Cl.
| | | |
|---|---|---|
| *G06T 19/00* | (2011.01) | |
| *G09G 5/36* | (2006.01) | |
| *G06F 3/044* | (2006.01) | |
| *G06F 3/01* | (2006.01) | |
| *G06T 11/60* | (2006.01) | |
| *B60K 35/00* | (2006.01) | |
| *H04L 29/08* | (2006.01) | |
| *B60R 1/00* | (2006.01) | |

(52) U.S. Cl.
CPC .............. *G06T 11/60* (2013.01); *B60K 35/00* (2013.01); *B60K 2370/31* (2019.05); *B60K 2370/334* (2019.05); *B60R 1/00* (2013.01); *B60R 2300/20* (2013.01); *H04L 67/12* (2013.01)

(58) Field of Classification Search
CPC ... G06T 19/006; G06F 3/017; G09G 2380/10; G09G 2340/12
See application file for complete search history.

(56) References Cited

U.S. PATENT DOCUMENTS

| | | | | |
|---|---|---|---|---|
| 7,881,860 B2* | 2/2011 | Noma | ................. | G06F 17/5095 345/156 |
| 9,019,128 B1* | 4/2015 | Kim, II | ................. | G01C 23/00 340/945 |
| 2012/0142273 A1* | 6/2012 | Ozaki | ................. | H04M 1/6091 455/66.1 |
| 2014/0002472 A1* | 1/2014 | Sobeski | ................. | G09G 5/026 345/582 |
| 2016/0019212 A1* | 1/2016 | Soldani | ................. | G06F 16/434 345/633 |

* cited by examiner

*Primary Examiner* — Samantha (Yuehan) Wang
(74) *Attorney, Agent, or Firm* — Reising Ethington P.C.; David Willoughby

(57) ABSTRACT

A system and method of enabling an augmented reality/virtual reality (AR/VR) device to augment image or video data using a virtual vehicle skin, wherein the method is carried out by vehicle electronics included within a vehicle, the method including: establishing a connection to the AR/VR device using a wireless communications device included in the vehicle electronics of the vehicle; and sending a virtual vehicle skin response to the AR/VR device via the established connection, wherein the AR/VR device is configured to obtain background video and to display the virtual vehicle skin over the obtained background video so that the virtual vehicle skin overlays a portion of the vehicle, and wherein the virtual vehicle skin response includes the virtual vehicle skin or virtual vehicle skin access information that can be used by the AR/VR device to derive or obtain the virtual vehicle skin.

8 Claims, 6 Drawing Sheets

VIRTUAL VEHICLE SKIN

INTRODUCTION

The present invention relates to using augmented reality/virtual reality (AR/VR) devices to present a virtual vehicle skin over images depicting a vehicle.

Vehicles include hardware and software capable of various multimedia functions, including playing audio received from radio stations, mobile devices (e.g., smartphones, tablets), many of which utilize wireless communications, such as short-range wireless communications (SRWC). Additionally, vehicles include numerous vehicle system modules (VSMs) that can be used to provide information to other electronic computing devices, such as personal mobile devices.

SUMMARY

According to one aspect of the invention, there is provided a method of enabling an augmented reality/virtual reality (AR/VR) device to augment image or video data using a virtual vehicle skin, wherein the method is carried out by vehicle electronics included within a vehicle, the method including: establishing a connection to the AR/VR device using a wireless communications device included in the vehicle electronics of the vehicle; and sending a virtual vehicle skin response to the AR/VR device via the established connection, wherein the AR/VR device is configured to obtain image or video data and to display the virtual vehicle skin over the obtained image or video data so that the virtual vehicle skin overlays a portion of the vehicle, and wherein the virtual vehicle skin response includes the virtual vehicle skin or virtual vehicle skin access information that can be used by the AR/VR device to obtain the virtual vehicle skin.

According to various embodiments, this method may further include any one of the following features or any technically-feasible combination of these features:
- the virtual vehicle skin is configured to be inserted into captured image or video data such that the virtual vehicle skin covers a portion of an interior cabin of the vehicle;
- receiving a first virtual vehicle skin request from the AR/VR device, sending a second virtual vehicle skin request to one or more remote servers in response to receiving the first virtual vehicle skin request, and receiving the virtual vehicle skin or the virtual vehicle skin access information;
- the virtual vehicle skin response includes the virtual vehicle skin;
- the digital representation of the virtual vehicle skin is obtained from memory included in the vehicle electronics;
- the virtual vehicle skin response includes virtual vehicle skin access information that includes information usable by the AR/VR device for obtaining the virtual vehicle skin from a remote server;
- the virtual vehicle skin access information includes a virtual vehicle skin token that, when presented to the remote server, results in the remote server sending the virtual vehicle skin to the AR/VR device;
- the AR/VR device is a pair of wearable electronic augmented reality/virtual reality (AR/VR) goggles configured for visually presenting augmented reality or virtual reality media content to a user; and/or
- the AR/VR device is a personal AR/VR device.

According to another aspect of the invention, there is provided a method of configuring an augmented reality/virtual reality (AR/VR) device to augment image or video data using a virtual vehicle skin, the method including: capturing image or video data using a camera included on the AR/VR device; receiving a virtual vehicle skin advertisement message from a vehicle, wherein the vehicle uses a wireless communications device to send the virtual vehicle skin advertisement message; in response to receiving the virtual vehicle skin advertisement message, sending a virtual vehicle skin request, wherein the virtual vehicle skin request includes information from the virtual vehicle skin advertisement message; and receiving a virtual vehicle skin response, wherein the virtual vehicle skin response includes a digital representation of the virtual vehicle skin or information that can be used by the AR/VR device to derive the digital representation of the virtual vehicle skin.

According to various embodiments, this method may further include any one of the following features or any technically-feasible combination of these features:
- the virtual vehicle skin request is sent to the vehicle, and wherein the virtual vehicle skin response is sent by the vehicle;
- the virtual vehicle skin response includes virtual vehicle skin access information, and wherein the method further includes the steps of: sending a second virtual vehicle skin request to a remote server using the virtual vehicle skin access information; and receiving a second virtual vehicle skin response that includes the digital representation of the virtual vehicle skin;
- the virtual vehicle skin includes a plurality of virtual vehicle skin components, and wherein the method further includes the steps of: determining to display at least one virtual vehicle skin component of the plurality of virtual vehicle skin components based on the image or video data; and rendering at least part of the at least one virtual vehicle skin component on a display of the AR/VR device;
- before rendering the at least part of the at least one virtual vehicle skin component on the display of the AR/VR device, modifying the at least one virtual vehicle skin component based on the one or more captured image or video data;
- the virtual vehicle skin includes virtual exterior environment graphics, and wherein the method further includes the steps of: determining exterior areas that are exterior to the vehicle and within the captured image or video data; and rendering the virtual exterior environment graphics within the exterior areas;
- determining an orientation of the AR/VR device using an accelerometer included on the AR/VR device;
- the vehicle is configured to determine a position of the AR/VR device within the vehicle and, thereafter, to obtain the virtual vehicle skin based on the position of the AR/VR device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Figure 1:
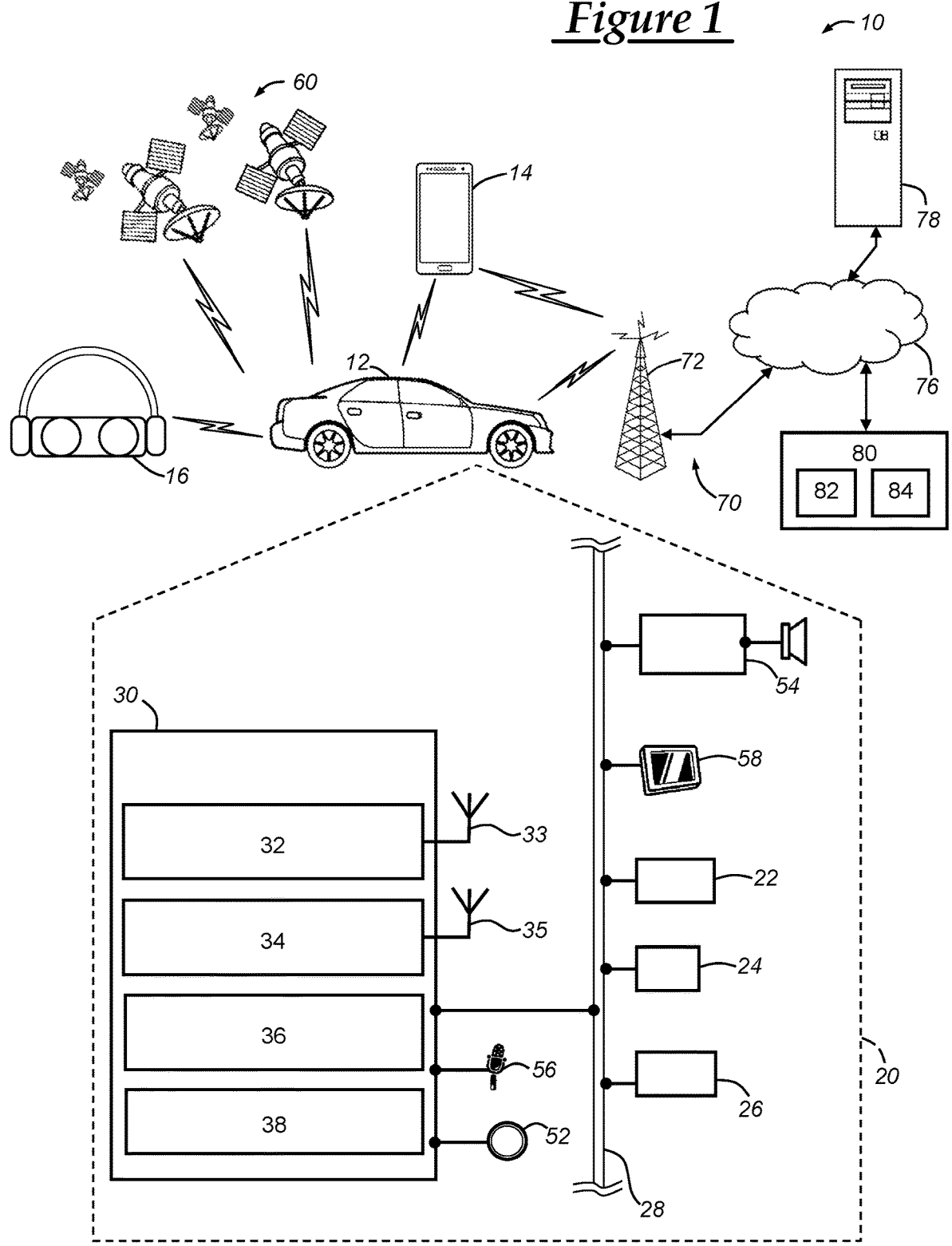
FIG. 1 is a block diagram depicting an embodiment of a communications system that is capable of utilizing the method disclosed herein.

The system and method described below enables an augmented reality/virtual reality (AR/VR) device to render virtual vehicle skins on a video or image such that the virtual vehicle skin is presented over an area corresponding to a vehicle. AR/VR devices can use camera(s) to capture an image or video of an area surrounding a user and, then, to render graphics over certain parts of the captured image or video. In this way, the AR/VR device can display graphics over real-life images or video of a user's surroundings such that the graphics supplement the user's visual perception of the surrounding environment. These supplemental graphics can be used to provide aesthetically pleasing graphics, as well as to provide information to the user. For example, virtual vehicle skins can be developed and displayed by AR/VR devices in conjunction with video or images of the user's environment to provide a perception that the vehicle looks as depicted in the virtual vehicle skins. AR/VR devices can use a camera that, when worn by a user, faces an area in front of the user (the "AR/VR device field of view"). In one embodiment, the AR/VR device is a pair of AR or VR goggles that are configured to fit around a user's head and that includes a display that, when the goggles are properly worn, is positioned in front of the user's eyes or field of vision. The AR/VR device can download a virtual vehicle skin that is associated with the vehicle and, when the vehicle is within the AR/VR device field of view, the AR/VR device can display the virtual vehicle skin on captured image or video in an area corresponding to the vehicle or a particular component of the vehicle. In many embodiments, the method and system discussed below can be used to augment an area within the interior of the vehicle, such as within an interior vehicle cabin.

In some embodiments, virtual vehicle skins can be developed based on a layout or design of a particular vehicle and, then, the virtual vehicle skins can be sent to AR/VR devices at or near the vehicle so that the AR/VR devices can display the virtual vehicle skins over the vehicle. Since the virtual vehicle skins correspond to a layout of the vehicle, the virtual vehicle skins can be presented over a corresponding area of the vehicle while still conveying the general layout of the vehicle so that the user can still operate the vehicle even when the virtual vehicle graphics are overlaid. For example, a virtual vehicle skin can be developed for an interior of a vehicle that includes various vehicle controls. The skin can be developed to provide various aesthetic effects while doing so within the confines of the vehicle layout, which can include designing the virtual vehicle skin to include the same physical shape and layout of the vehicle. Thus, when the virtual vehicle skin is presented over areas of the vehicle, the functional aspects of the vehicle, such as the various vehicle controls, can still be seen and used by the user and, additionally, the general layout may still be retained so that the user may still be aware of the physical confines of the vehicle.

In one embodiment, a user can access a virtual vehicle skin catalog and select various virtual vehicle skins that the user desires to have associated with their vehicle. The user can select and/or purchase such virtual vehicle skins and, thereafter, the virtual vehicle skins can be associated with a particular vehicle of the user. The virtual vehicle skins can then be sent to the vehicle, which can store the skins and/or send the skins to AR/VR devices. In one particular embodiment, the vehicle can broadcast a virtual vehicle skin availability message that indicates to the AR/VR devices that virtual vehicle skins are available for the vehicle. The vehicle can then receive a request for a particular skin and, in response thereto, the vehicle can obtain the virtual vehicle skin and send the virtual vehicle skin to the AR/VR device. In some embodiments, obtaining the virtual vehicle skin can include sending a request for the skin to a remote facility and then receiving the virtual vehicle skin from the remote facility. In other embodiments, obtaining the virtual vehicle skin can include recalling the virtual vehicle skin from a memory device located in the vehicle.

As mentioned above, the vehicle can periodically transmit a virtual vehicle skin availability message. Upon receiving this indication at an AR/VR device, the AR/VR device can determine whether to obtain a particular virtual vehicle skin and, if so, the AR/VR device can send a virtual vehicle skin request to the vehicle or to a remote facility. In one embodiment, the virtual vehicle skin request can be generated based on information (e.g., VIN, virtual vehicle skin ID) in the virtual vehicle skin availability message and then the request can be sent to a remote facility. The remote facility can respond by sending the requested virtual vehicle skin to the AR/VR device. In other embodiments, the virtual vehicle skin request can be sent to the vehicle, which can then obtain the virtual vehicle skin(s) and send them to the AR/VR device. Once the AR/VR device receives the virtual vehicle skin, the AR/VR device can present the virtual vehicle skin on captured image or video of the surrounding area so that graphics of the virtual vehicle skin are shown over the vehicle or a vehicle component.

With reference to FIG. 1, there is shown an operating environment that comprises a communications system 10 and that can be used to implement the method disclosed herein. Communications system 10 generally includes a vehicle 12 with a wireless communications device 30, augmented reality/virtual reality (AR/VR) devices 14 and 16, a constellation of global navigation satellite system (GNSS) satellites 60, one or more wireless carrier systems 70, a land communications network 76, a computer or server 78, and a remote facility 80. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as for purchasing or selecting various virtual vehicle skins for use with vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to vehicle 12. In one embodiment, computers 78 can be used to carry out the method discussed herein; in other embodiments, the method can be carried out by servers or other computing devices at remote facility 80, as discussed more below; and, it yet another embodiment, the method can be carried out by a combination of computers 78 and servers at remote facility 80.

Remote facility 80 may be designed to provide the vehicle electronics 20 and/or AR/VR devices 14,16 with a number of different system back-end functions through use of one or more electronic servers and, in many cases, may be a vehicle backend services facility that provides vehicle-related back-end functionality. The remote facility 80 includes servers (vehicle backend services servers) 82 and databases 84, which may be stored on a plurality of memory devices. Also, remote facility 80 can include one or more switches, live advisors, an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware programs stored in the memory (e.g., EEPROM, RAM, ROM), which enable the servers 82 to provide a wide variety of services. For instance, the at least one processor can execute programs or process data to carry out at least a part of the method discussed herein. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70. In one embodiment, servers 82 include an application that carries out at least some of the method illustrated below in FIG. 4.

Databases 84 can be stored on a plurality of memory, such as RAM, other temporary powered memory, any non-transitory computer-readable medium (e.g., EEPROM), or any other electronic computer medium that stores some or all of the software needed to carry out the various external device functions discussed herein. Also, one or more databases at the remote facility can store account information, as well as virtual vehicle skin association information and/or the virtual vehicle skins. As used herein, "virtual vehicle skin association information" refers to that information that associates a particular vehicle with a particular virtual vehicle skin. Digital representations of the virtual vehicle skins can be stored at databases 84. Also, a vehicle information database can be included that stores information pertaining to one or more vehicles, such as vehicle identification numbers (VINs), virtual vehicle skin identifiers, vehicle layout types or features, as well as various other data pertaining to the vehicle. The vehicle layout types or features can indicate general layout of the vehicle and may correspond to a model-year (e.g., 2018 Cruze®). Moreover, particular features of a particular vehicle can be stored in databases 84, such as whether the particular vehicle includes one or more optional features.

Smartphone 14 is an augmented reality/virtual reality (AR/VR) device that is capable of providing media content to one or more interfaces (either included in smartphone 14 or included at another device connected to smartphone 14). As used herein, "AR/VR device" refers to those devices that are configured to obtain and present AR/VR media content and that include suitable hardware and processing capabilities for presenting AR/VR media content. Non-limiting examples of media control devices are a smartphone, personal computer (PC), laptop, tablet, smart television, and AR/VR goggles or displays. In some embodiments, the smartphone (media control device) 14 may include: hardware, software, and/or firmware enabling cellular telecommunications and short-range wireless communications (SRWC) as well as other mobile device applications. As used herein, a personal AR/VR device is an AR/VR device that is portable by a user and where the portability of the device is at least partly dependent on the user, such as a wearable device (e.g., a smartwatch, AR/VR goggles), an implantable device, or a handheld device (e.g., a smartphone, a tablet, a laptop). And, as used herein, a short-range wireless communications (SRWC) device is a device capable of SRWC and that includes the requisite SRWC circuitry to perform such SRWC.

In many embodiments, the hardware of the AR/VR devices, including smartphone 14, may comprise a processor and memory (e.g., non-transitory computer readable medium configured to operate with the processor) for storing the software, firmware, etc. In one embodiment, the AR/VR devices can include a SRWC circuit, such as the one discussed below with respect to wireless communications device 30 of vehicle 12. The AR/VR device's processor and memory may enable various software applications, which may be preinstalled or installed by the user (or manufacturer) (e.g., having a software application or graphical user interface (GUI)). One implementation of an AR/VR device application may enable the AR/VR device (e.g., smartphone 14) to receive media content (e.g., virtual vehicle skins) via land network 76 and/or cellular carrier system 70, and to play or otherwise present the media content to a user via one or more user-device interfaces at the AR/VR device. In one embodiment, AR/VR device 14 may include a display that can be used to visually present media content to a user and may include an audio system that can be used to audibly present media content to a user. Other playback components or devices can be included and/or controlled by the AR/VR device 14, such as a tactile or haptic device.

In some embodiments, a visual display head mount can be used in conjunction with AR/VR device (e.g., smartphone 14) to mount the device in front of the user's field of vision, as well as enclosing the peripheral field of view of the user. The visual display head mount can be a separately sold and manufactured device that includes a slot or that is otherwise configured for holding AR/VR devices in an orientation such that, when the device is placed within the slot (or otherwise attached to the visual display head mount) and worn properly by the user, the display of the AR/VR device is within the user's field of vision. Such a visual display head mount that is used in conjunction with a suitable AR/VR device can be used to transform an ordinary AR/VR device (e.g., smartphone) into a pair of AR/VR goggles. As those skilled in the art will appreciate, even though AR/VR headsets may be referred to as a pair of goggles, only a single display is required, rather than a pair of displays as the name would ostensibly imply.

The pair of Augmented Reality/Virtual Reality (AR/VR) goggles 16 is an AR/VR device that can be used to obtain, process, and present audiovisual content to a user, such as virtual vehicle skins. The pair of AR/VR goggles 16 is a head-mounted display that includes a processor and memory, as well as computer instructions (e.g., software, firmware) that enables AR/VR media content to be displayed. And, in some embodiments, the AR/VR goggles 16 can be an AR/VR headset that is manufactured to include AR/VR goggles integrated with a head mount and that includes an audio speaker. The AR/VR goggles 16 can also include other components, such as a SRWC circuit (similar to SRWC circuit 32 discussed below), an accelerometer (or orientation sensors), one or more cameras or other lens capable of receiving and digitizing light signals, a battery, speakers or headphones for presenting audio content, and various other hardware or software components. The AR/VR goggles can be configured for use with applications developed according to a software development kit (SDK) that is configured specifically for AR/VR devices, or that can support AR/VR functionality.

Additionally, as mentioned above, the AR/VR goggles can include speakers or headphones that can present audio content to the user via soundwaves. Such audio content may be a part of audiovisual media content, and the audio and video output of the AR/VR goggles can be synced. In other embodiments, the AR/VR goggles may only include a video output and may connect with other user-device interfaces, such as those included in the vehicle, to output the audio content. And, as will be discussed in more detail below, the AR/VR goggles can send virtual vehicle skin requests to the vehicle in an attempt to obtain one or more virtual vehicle skins for use in augmenting a field of view of the AR/VR goggles that includes an area of the vehicle. These virtual vehicle skin requests can be bundled into a single request that is sent by the AR/VR goggles initially (e.g., at the beginning of an immersive media content experience), or may be sent at times corresponding to when the requested vehicle functionality is desired.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) module 22, body control unit (BCM) 24, other vehicle system modules (VSMs) 26, and a wireless communications device 30. Some or all of the different vehicle electronics may be connected for communication with each other via one or more communication busses, such as bus 28. Communications bus 28 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS module 22, BCM 24, wireless communications device 30, and vehicle-user interfaces 52-58, as will be described in detail below. The vehicle 12 can also include other VSMs 26 in the form of electronic hardware components that are located throughout the vehicle and, which may receive input from one or more sensors and use the sensed input to perform diagnostic, monitoring, control, reporting, and/or other functions. Each of the VSMs 26 is preferably connected by communications bus 28 to the other VSMs, as well as to the wireless communications device 30, and can be programmed to run vehicle system and subsystem diagnostic tests. One or more VSMs 26 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Wireless communications device 30 is capable of communicating data via short-range wireless communications (SRWC) and/or via cellular network communications through use of a cellular chipset 34, as depicted in the illustrated embodiment. In the illustrated embodiment, wireless communications device 30 includes an SRWC circuit 32, a cellular chipset 34, a processor 36, memory 38, and antennas 40 and 50. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™ WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70. In other embodiments, the cellular chipset 34 may be incorporated into another VSM, such as a separate telematics unit.

Wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may include RAM, other temporary powered memory, any non-transitory computer-readable medium (e.g., EEPROM), or any other electronic computer medium that stores some or all of the software needed to carry out the various external device functions discussed herein. Similar components to those previously described (processor 36 and/or memory 38, as well as SRWC circuit 32 and cellular chipset 34) can be included in AR/VR devices 14 and/or 16.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by a body control module or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

The vehicle may use the wireless communications device 30 to detect other SRWC devices, such as AR/VR devices 14,16. A connection between the wireless communications device 30 and one or more devices 14,16 may allow for the operation of various vehicle-device functionality. Vehicle-device functionality (or function) refers to any function of the vehicle that may be complimented, improved, supported, or carried out through a AR/VR device; any function of the AR/VR device that may be complimented, improved, supported, or carried out through the vehicle; or any other function that may be carried out using the vehicle and one or more AR/VR devices. For example, vehicle-device functionality can include using the AR/VR device 14 to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the AR/VR device with hands-free calling, such as through use of vehicle-user interfaces to place, receive, and carry out voice calls; sending information to the AR/VR device, such as geographical information to the AR/VR device 14 (such as information obtained from the GPS module 22) or vehicle diagnostic information or codes; and carrying out commands (e.g., commands to perform certain vehicle functions) received at the vehicle from the personal content playback device.

The wireless communications device 30 may be configured to listen for one or more wireless signals, such as those that may be sent by AR/VR device 14. In one embodiment, wireless communications device 30 may receive a connection request message from AR/VR device 14 or 16. Thereafter, the wireless communications device 30 can establish a SRWC connection with the requesting device via a four-way handshake and/or other connection establishment processes, such as those that establish a shared secret or one or more digital keys or other credentials used for securing the SRWC connection.

In one embodiment, wireless communications device 30 may be set to a discovery mode when the vehicle is switched to a powered on state. As used herein, a discovery mode is an operating mode for a SRWC device in which the SRWC device sends out wireless messages that typically are intended to discover or detect other SRWC devices using a SRWC protocol or technology. The discovery mode may include periodically or intermittently sending out messages or advertisements in an attempt to elicit a response from other SRWC devices in range. In one embodiment, the wireless communications device 30 may transmit a Bluetooth™ Low Energy advertising package (e.g., an advertisement), such as an ADV_IND (an undirected advertisement) message, an ADV_DIRECT_IND (a directed advertisement) message, or an ADV_SCAN_IND (scanable undirected advertisement). For example, the wireless communications device 30 may transmit an ADV_IND message according to a predefined or predetermined time interval (e.g., 30 milliseconds (ms)). Or, the device 30 may vary the time interval by randomizing the interval (e.g., randomly or pseudo-randomly selecting a time between 10 ms and 40 ms for each advertisement). This advertisement can include information indicating that virtual vehicle skins are available for use with AR/VR devices for supplementing or augmenting a view of vehicle 12. In other embodiments, a wired communication connection can be established between AR/VR devices 14,16 and the vehicle, such as through using Universal Serial Bus (USB) cables and drivers included on the respective devices.

Global navigation satellite system (GNSS) module 22 receives radio signals from a constellation of GNSS satellites. In one embodiment, the GNSS module 22 may be a global positioning system (GPS) module, which may receive GPS signals from a constellation of GPS satellites 60. GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 28 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display and can be used to provide a multitude of input and output functions. Display 58 can be a touch screen on the instrument panel, a heads-up display reflected off of the windshield, or a projector that can project graphics for viewing by a vehicle occupant. Various other vehicle user interfaces can also be utilized, as the interfaces of FIG. 1 are only an example of one particular implementation.

Body control module (BCM) 24 is shown in the exemplary embodiment of FIG. 1 as being electrically coupled to communication bus 28. In some embodiments, the BCM 24 may be integrated with or part of a center stack module (CSM) and/or integrated with wireless communications device 30. Or, the BCM may be a separate device that is connected to one another via bus 28. BCM 24 can include a processor and/or memory, which can be similar to processor 34 and memory 36 of wireless communications device 30, as discussed below. BCM 24 may communicate with wireless device 30 and/or one or more vehicle system modules, such as an engine control unit (ECU) (not shown), audio system 54, or other VSMs 26. BCM 24 may include a processor and memory such that the BCM may direct one or more vehicle operations including, for example, controlling central locking, air conditioning, power mirrors, controlling the vehicle primary mover (e.g., engine, primary propulsion system), and/or controlling various other vehicle modules. BCM 24 may receive data from the wireless communications device 30 and, subsequently, send the data to one or more vehicle modules.

Additionally, BCM 26 may provide vehicle state information corresponding to the vehicle state or of certain vehicle components or systems. For example, the BCM may provide the device 30 with information indicating whether the vehicle's ignition is turned on, the gear the vehicle is presently in (i.e. gear state), and/or other information regarding the vehicle. The BCM 26 can obtain information from one or more other vehicle modules to obtain this information.

Figure 2:
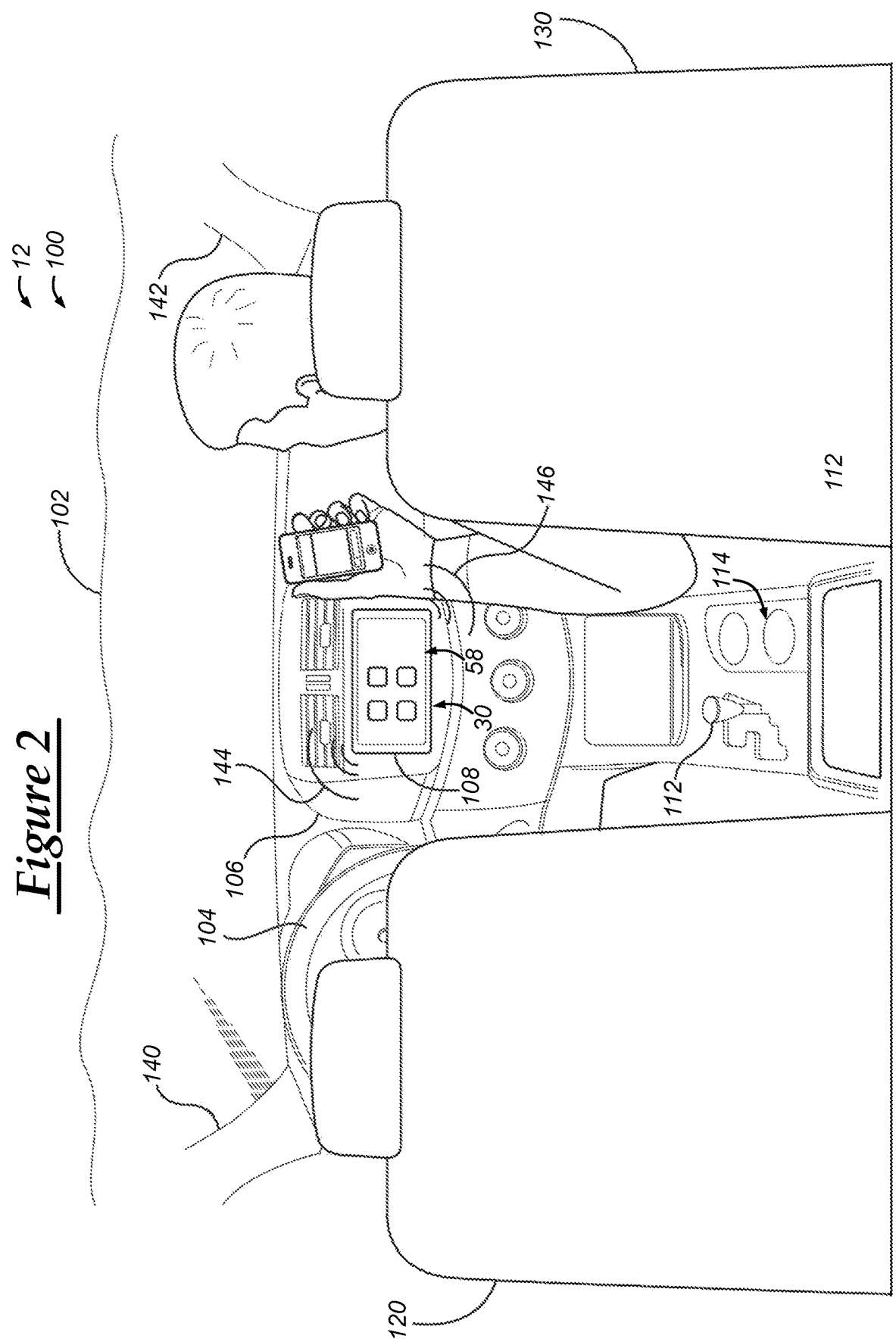
FIG. 2 is a perspective view depicting an embodiment of an interior of a vehicle.
Figure 3:
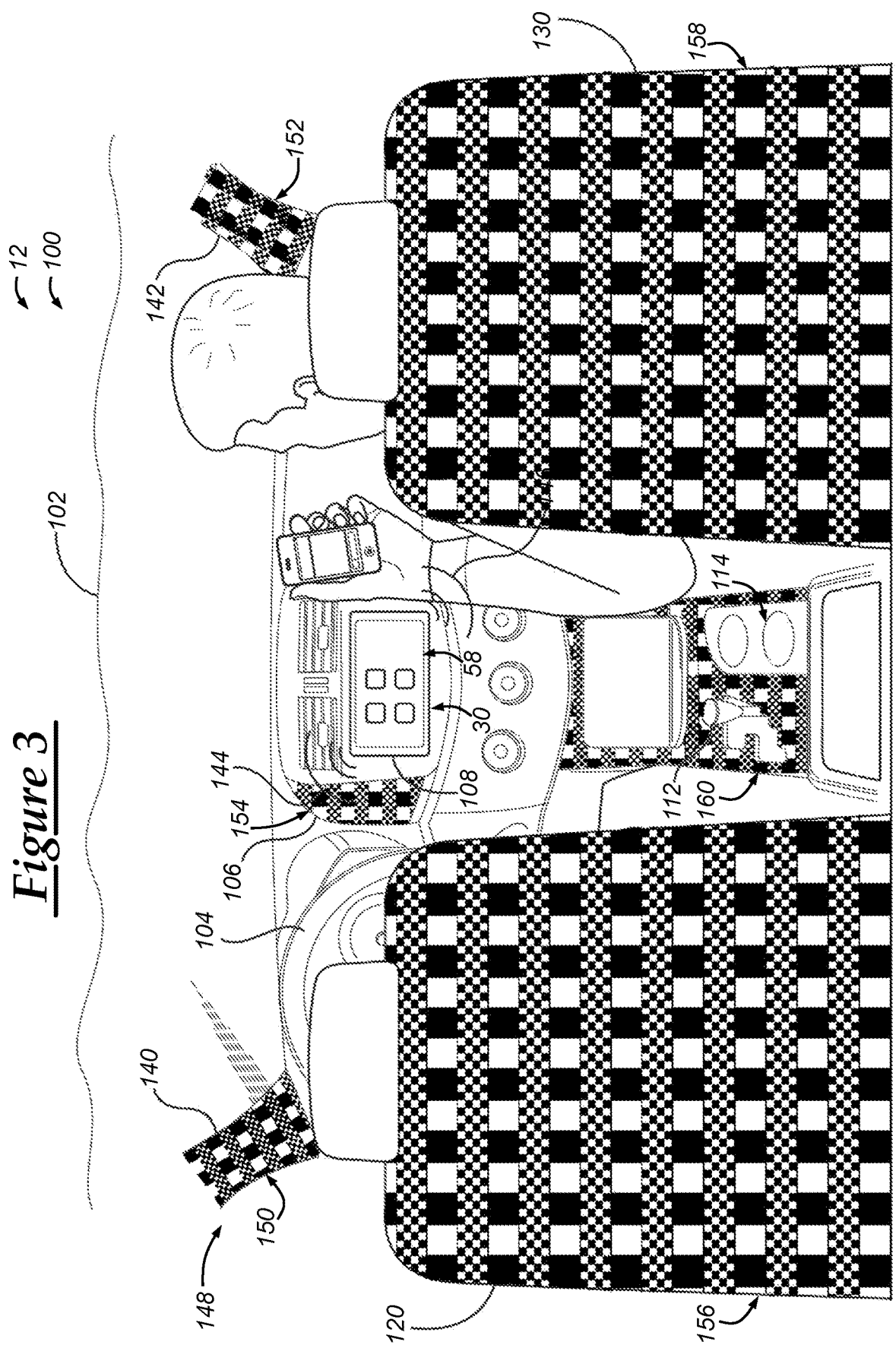
FIG. 3 is a perspective view depicting an embodiment of an interior of a vehicle with a virtual vehicle skin applied to the interior of the vehicle.

With reference to FIGS. 2 and 3, there is shown an interior 100 of a vehicle 12 from the perspective of a passenger in the back row of seats looking forward through windshield 102 using an AR/VR device, such as smartphone 14 or AR/VR goggles 16. FIG. 2 is a perspective view through the AR/VR device without a virtual vehicle skin applied and FIG. 3 is a perspective view through the AR/VR device with a virtual vehicle skin applied. The vehicle interior 100 includes the windshield 102, steering wheel 104, center console or instrument panel 106 that holds touchscreen display 58 and wireless communications device 30, a touchscreen user interface 108 displayed on touchscreen 58, a shifter 112, seats 120 and 130, and A-pillars 140 and 142. Wireless communications device 30 communicate with AR/VR devices within or near vehicle interior 100, as shown by wireless signals 144 and 146.

As shown in the illustrated embodiment of FIG. 3, a virtual vehicle skin can be presented over the interior 100 of vehicle 12, such as at particular vehicle components. For example, virtual vehicle skin 148 comprises numerous virtual vehicle skin components 150-160. The virtual vehicle skin includes virtual trim skin graphics shown at 154 and 160, as well as virtual seat skin graphics 156 and 158. Moreover, virtual A-pillar skin graphics are shown at 150 and 152, which are presented over A-pillars 140 and 142, respectively. The virtual vehicle skin components can be configured to correspond to a particular vehicle component, such as seats 120,130, pillars 140,142, and/or other vehicle trim or components. The virtual vehicle skin components can be rendered individually and may be individually resized, repositioned, transformed, and/or modified individually based on movement of the AR/VR device, as those skilled in the art will appreciate. Moreover, functional features of the vehicle, such as cup-holders 114, display 58, and shifter 112 are not covered by the virtual vehicle skin so as to enable continued use and awareness of these functional vehicle components. In other embodiments, the method (as discussed below) can include determining which vehicle functional components are out of reach of the AR/VR device user and, in such a case, these functional components may still be covered by vehicle skin 148 since the AR/VR device user cannot reach to access these components anyway. And, although a single, plaid/checkered themed virtual vehicle skin is depicted, various designs, themes, scenes, colors, patterns, and other visual effects can be used or incorporated into the virtual vehicle skin.

Figure 4:
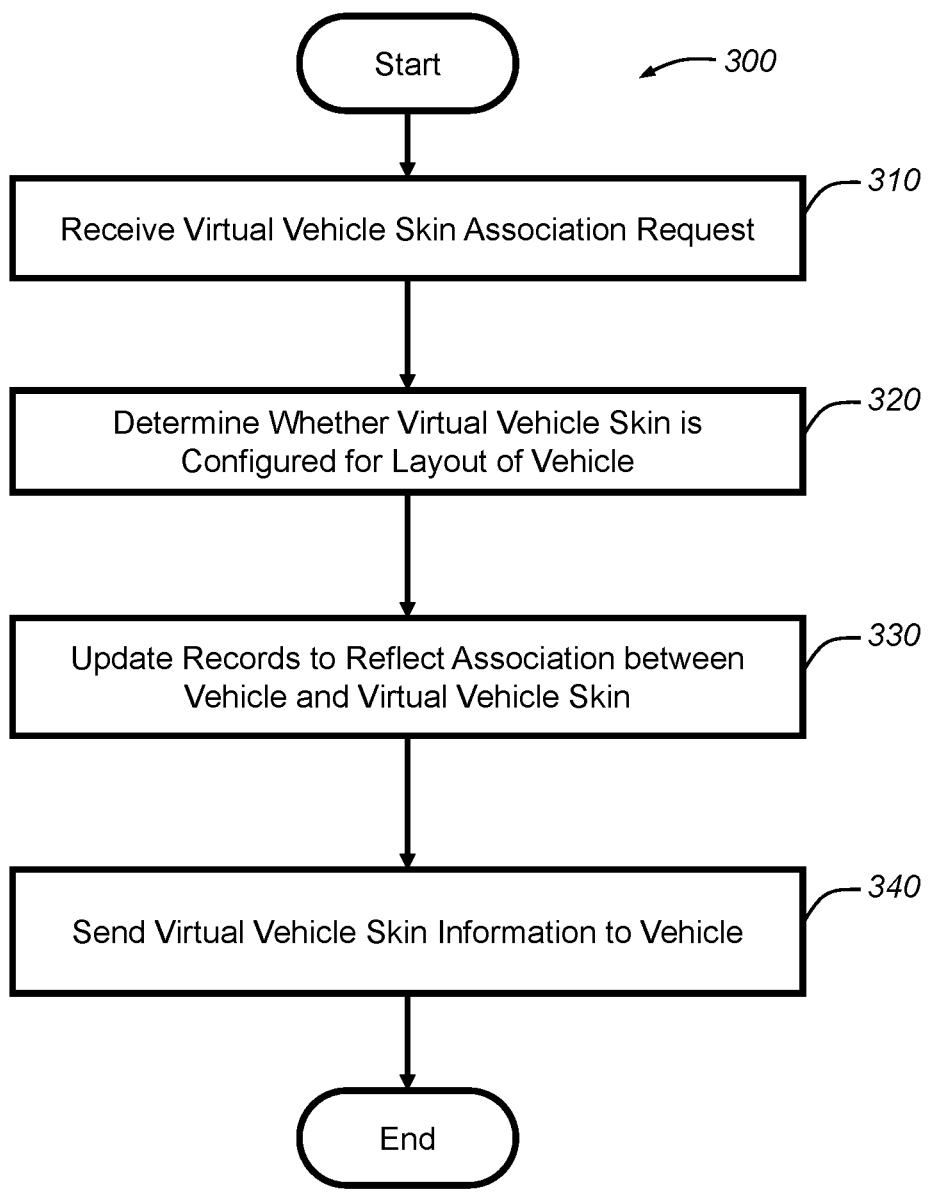
FIG. 4 is a flowchart of an embodiment of a method of broadcasting an indication that virtual vehicle skins are available for use with augmented reality/virtual reality (AR/VR) devices.

With reference to FIG. 4, there is shown a method 300 of broadcasting an indication that virtual vehicle skins are available for use with augmented reality/virtual reality (AR/VR) devices. Method 300 can be carried out by one or more remote servers, such as remote servers 82 at remote facility 80. According to many embodiments, method 300 enables a user to specify one or more virtual vehicle skins that can be used to augment graphics over the user's vehicle when being viewed by a user using an AR/VR device. For example, a vehicle owner or operator may use a client device (e.g., computer 78, AR/VR device 14,16) to select one or more virtual vehicle skins that are aesthetically pleasing to them, such as a virtual vehicle skin that is themed as their favorite superhero, such as Batman™ or Superman™. Other virtual vehicle skins can be developed for augmenting images of a vehicle, such as a jungle theme, an outer space theme, or a sports theme.

Prior to method 300, a user may use a computer, which can include an AR/VR device, to access a virtual vehicle skin catalog (i.e., list of virtual vehicle skins). The user may browse various skins, as well as input vehicle information concerning the type of vehicle or the identity of the vehicle. As mentioned above, virtual vehicle skins can be fitted or designed to correspond to a layout of the vehicle and, thus, the variety of virtual vehicle skins may vary by vehicle model or model-year. Vehicle information concerning the type or identity of the vehicle can be inputted into the virtual vehicle skin catalog and, then, the virtual vehicle skins can be filtered based on the inputted vehicle information. In one embodiment, the virtual vehicle skins can be purchased from the virtual vehicle skin catalog and, when purchased, the virtual vehicle skins may be downloaded to the vehicle, an AR/VR device, or other device.

Method 300 begins with step 310, wherein a virtual vehicle skin association request is received. The virtual vehicle skin association request can be a message that indicates that a user desires to have a particular virtual vehicle skin associated with their vehicle or account. This request can be generated and/or sent by the client device that the user is operating to view the virtual vehicle skin catalog. In one embodiment, once a user purchases a virtual vehicle skin (or otherwise selects to have a virtual vehicle skin associated with the user's vehicle), the virtual vehicle skin association request can be generated and sent to the remote server.

In one embodiment, the virtual vehicle skin association request can include an identifier of the user's vehicle, or other vehicle information that can be used to obtain a list of suitable virtual vehicle skins for the user's vehicle. In one embodiment, the virtual vehicle skin association request can include a vehicle identification number (VIN) that can then be used to obtain particular information regarding the vehicle, including the model-year of the vehicle, as well as particular optional features that are included in the vehicle. The remote server can then use the specific vehicle information to determine whether the selected virtual vehicle skin is suitable for use with the vehicle (see step 320).

In other embodiments, an identifier of the vehicle (e.g., VIN, model-year) can be sent to the remote server and, in response, the remote server can send information concerning various virtual vehicle skins to the client device (e.g., computer 78). The information concerning the various virtual vehicle skins can then be presented to the user and, thereafter, the user can select a particular virtual vehicle skin. After selecting a particular virtual vehicle skin, the client device can generate and send a virtual vehicle skin association request to the remote server. In such an embodiment, the virtual vehicle skin association request may not include any particular information regarding the user's vehicle 12, as this information was previously sent to the remote server. In other embodiments, the virtual vehicle skin can be associated with a user's account and, also, the user's account can be associated with one or more vehicles. The method 300 can then continue to step 320.

In step 320, it is determined whether a particular virtual vehicle skin is suited or configured for use with the user's vehicle. In some embodiments, this step may be carried out prior to receiving the virtual vehicle skin association request. For example, the remote server may already have information concerning a particular vehicle before the virtual vehicle skin association request is received and, thus, at this time the remote server can verify which skins are suitable for use with the vehicle 12. In other embodiments, this determination can be made after receiving the virtual vehicle skin association request. Once it is determined that the requested virtual vehicle skin is suitable or configured for use with the vehicle, the method 300 continues to step 330.

In step 330, records can be updated to reflect an association between the vehicle and the virtual vehicle skin. As mentioned above, databases may be kept that store information pertaining to vehicles and to virtual vehicle skins. These databases can be updated to reflect that a particular virtual vehicle skin is associated with a particular vehicle. In one embodiment, databases 84 can include a virtual vehicle skin database that includes information concerning the virtual vehicle skins, as well as vehicle-skin association information, which is information that indicates a particular vehicle or user is authorized to have a virtual vehicle skin presented over a captured image or video of the vehicle when using an AR/VR device. In other embodiments, this step can include associating the requested virtual vehicle skin with a user's account, which is also associated with particular vehicles. The method 300 continues to step 340.

In step 340, virtual vehicle skin information concerning the virtual vehicle skin that was indicated in the virtual vehicle association request can be sent to the vehicle. In one embodiment, the virtual vehicle skin information can be sent via land network 76 and cellular carrier system 70. The vehicle can receive the virtual vehicle skin information using wireless communications device 30, which can include a cellular chipset 34. In one embodiment, the virtual vehicle skin information can be sent to the vehicle soon after the virtual vehicle skin is purchased and/or associated with the particular vehicle. Or, in other embodiments, the virtual vehicle skin information can be sent to the vehicle 12 in response to receiving a request from the vehicle 12, such as a virtual vehicle skin request (see step 420 of method 400 (FIG. 5)).

In one embodiment, the virtual vehicle skin information can include an identifier of the virtual vehicle skin. This identifier can then be used by the vehicle to request the virtual vehicle skin from a remote database, such as database 84. In other embodiments, the virtual vehicle skin information can include data representing the virtual vehicle skin, which can include various graphics and other information, such as positional information or other information that can aid an AR/VR device in properly presenting the virtual vehicle skin over the vehicle.

After the virtual vehicle skin information is received, the virtual vehicle skin information can be stored in a memory device of the vehicle. In one embodiment, the virtual vehicle skin information can be stored in memory 38 of wireless communications device 30, or the vehicle can use other memory devices to store this information. Additionally, the vehicle can use the virtual vehicle skin information to transmit or broadcast virtual vehicle skin availability messages intended for reception by one or more AR/VR devices. The virtual vehicle skin availability messages can indicate that one or more particular virtual vehicle skins are available for presentation in an augmented reality view of the vehicle. This broadcasting step that is carried out by the vehicle is discussed more below, specifically in step 410 of method 400 (FIG. 5).

Figure 5:
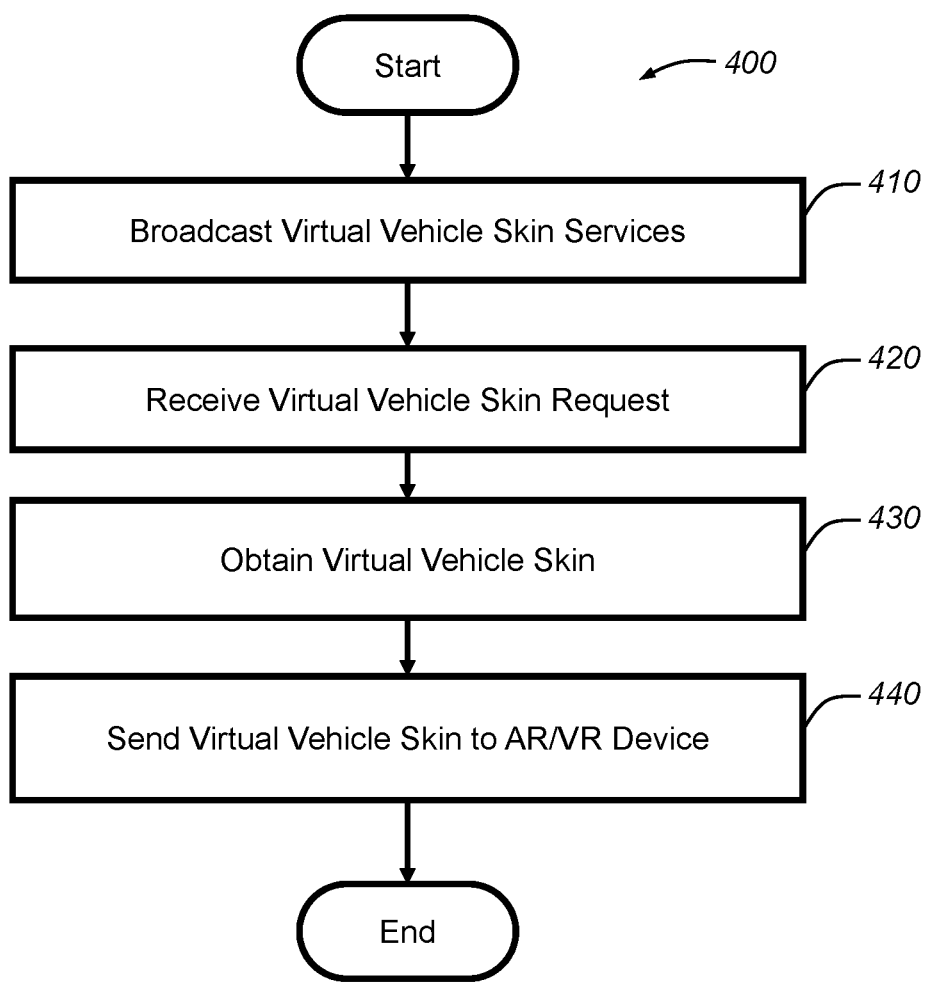
FIG. 5 is a flowchart of an embodiment of a method of sending virtual vehicle skin information to an AR/VR device.
Figure 6:
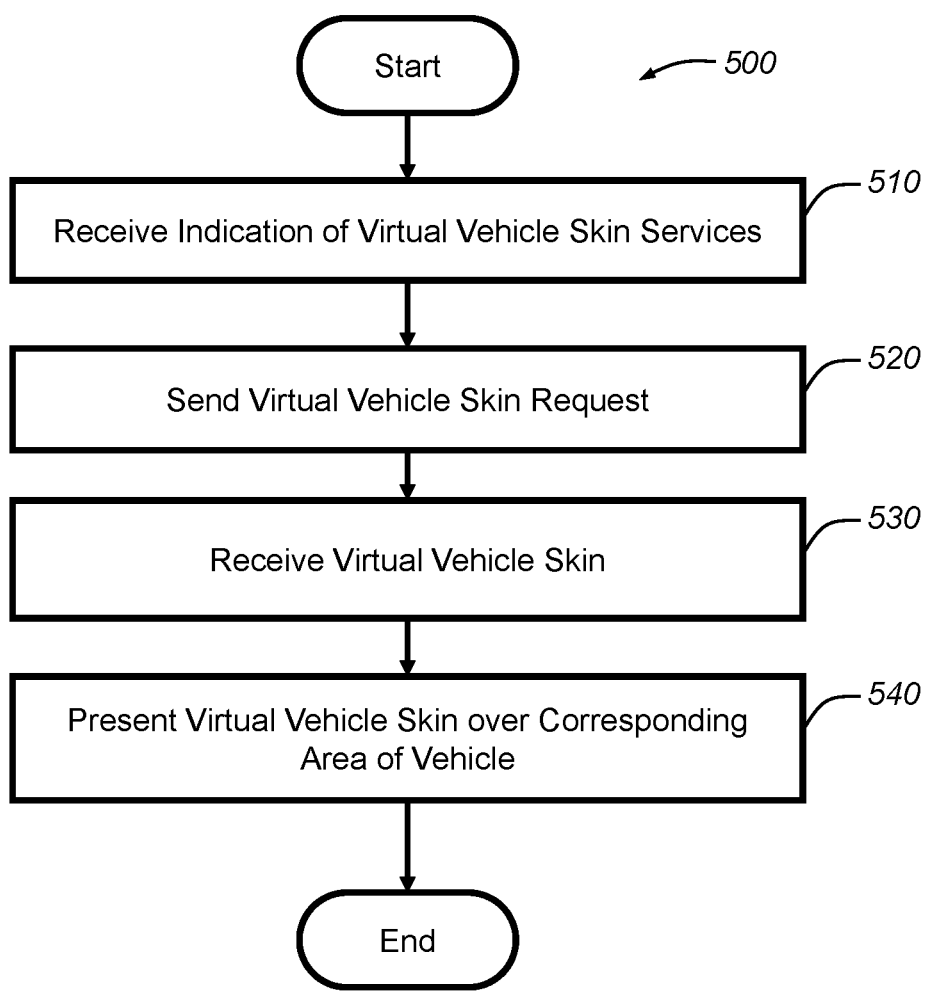
FIG. 6 is a flowchart of an embodiment of a method of presenting virtual vehicle skins over a corresponding area of a vehicle using an AR/VR device.

With reference to FIG. 5, there is shown an embodiment of a method 400 of sending virtual vehicle skin information to an AR/VR device. In some embodiments, method 400 can be carried out by vehicle 12 using wireless communications device 30. Method 400 begins with step 410, wherein a virtual vehicle skin availability message is transmitted or broadcasted. The virtual vehicle skin availability message can be a wireless message that indicates virtual vehicle skins are available for download and/or presentation over captured image or video of the vehicle using an AR/VR device. This indication may include specifying a service identifier (service ID) in the virtual vehicle skin availability message that indicates a virtual vehicle skin service is available for use by the AR/VR device. And, in other embodiments, the virtual vehicle skin availability message can include information concerning particular virtual vehicle skins that are supported for use by an AR/VR device at the vehicle. For example, an AR/VR device may receive a virtual vehicle skin availability message from the vehicle and, in response thereto, may prompt a user for feedback as to whether the user would like to display a virtual vehicle skin over the vehicle. The user can then use one or more controls at their AR/VR device to respond, as is explained in more detail below in step 520 (FIG. 6).

In one embodiment, the virtual vehicle skin availability message can be periodically transmitted by the vehicle using those advertisement message discussed above. Or, the message may be transmitted in response to a user configuring the vehicle to broadcast that virtual vehicle skins are available for download and/or presentation over captured image or video of the vehicle using an AR/VR device. The method 400 continues to step 420.

In step 420, a virtual vehicle skin request is received at the vehicle. The virtual vehicle skin request can be sent from an AR/VR device, such as smartphone 14 or AR/VR goggles 16. The virtual vehicle skin request can be sent via SRWC and/or via a wired connection, such as a Universal Serial Bus (USB) connection. In one embodiment, an SRWC connection can be established after the virtual vehicle skin availability message is received by the AR/VR device and, after establishing the SRWC connection, the AR/VR device can send the virtual vehicle skin request to the vehicle via the established SRWC connection.

In the case of establishing a connection using a wired connection, a user can plug a cord or cable, such as a USB cable, into a corresponding port included within the vehicle and within the AR/VR device. In other embodiments, where a SRWC connection is established, the vehicle can send out a beacon or advertisement using SRWC circuit 32. The advertisement can be the same message as the virtual vehicle skin availability message discussed in step 410, or may be a separate message. The connection advertisement message can include data indicating that the vehicle desires to or can connect with an AR/VR device, or that the vehicle can offer virtual vehicle skin services (i.e., virtual vehicle skin(s) are associated with the vehicle, are available for download, and/or can be presented over captured image or video of the vehicle using an AR/VR device). This message can then be received by the AR/VR device, which can then generate a response thereto, such as a message that initiates a four-way handshake or other authentication and/or shared key/secret establishment process. In other embodiments, the AR/VR device can transmit an advertisement or beacon message indicating to those SRWC devices within range that the AR/VR device is searching for devices that can provide virtual vehicle skin services. Once the connection is established, the AR/VR device may send the virtual vehicle skin request via the established connection.

In one embodiment, the virtual vehicle skin request can specify a particular virtual vehicle skin (the "requested virtual vehicle skin") that the AR/VR device desires to obtain for presentation to the user. In such an embodiment, the requested virtual vehicle skin can be specified by including a virtual vehicle skin identifier, which can then be used by vehicle 12 or remote server 82 to obtain the corresponding virtual vehicle skin.

In other embodiments, the virtual vehicle skin request may be a general virtual vehicle skin request and may not specify a particular virtual vehicle skin, but may indicate that the AR/VR device is interested or may be interested in receiving any virtual vehicle skin. In one embodiment, after receiving the general virtual vehicle skin request, the SRWC connection (as discussed above) can be established. Thereafter, the vehicle can then send more specific information to the AR/VR device, such as the particular virtual vehicle skins that the vehicle has to offer, which can include one or more virtual vehicle skin identifiers and/or representative graphics (i.e., a preview of the virtual vehicle skin). A user may then use their AR/VR device to select a particular virtual vehicle skin. And, in some embodiments, the virtual vehicle skin request can also include AR/VR device location and position information, which can be information that can be used to establish a position of the AR/VR device 14,16 within vehicle interior 100 and/or an orientation of the AR/VR device. In one embodiment, AR/VR device 14,16 can use an accelerometer to determine an orientation of the AR/VR device. The method 400 continues to step 430.

In step 430, the vehicle obtains the virtual vehicle skin that was selected by the user. In the case where only a single virtual vehicle skin is available for use with vehicle 12, it can be said that, when the user sends a general virtual vehicle skin request, the user has selected the single virtual vehicle skin. In one embodiment, the vehicle may already include virtual vehicle skin data stored in memory that represents the virtual vehicle skin and, thus, the vehicle may simply recall this data from memory, such as memory 38. In other embodiments, the vehicle may include virtual vehicle skin information, such as that which is received in step 340 (FIG. 4), but may not include the virtual vehicle skin itself. In such a case, the vehicle can then query one or more remote servers, such as remote servers 82, for the virtual vehicle skin. After receiving the virtual vehicle skin, the vehicle may store the virtual vehicle skin into memory, such as memory 38, for use at a later time, such as upon receiving another virtual vehicle skin request.

Additionally, after obtaining the virtual vehicle skin, the vehicle can process the skin or various components of the skin based on AR/VR device location and position information. For example, the AR/VR device view can depend on a location and position of the AR/VR device and, thus, the virtual vehicle skin can be modified in light of these attributes before being sent to the AR/VR device. While the AR/VR device can take care of most AR/VR processing, the vehicle can assist the AR/VR device by providing only those components of the virtual vehicle skin that are within view of a user at the AR/VR device's position. For example, the graphic components 156 and 158 of the back-side of seats 120 and 130 would most likely not be needed by a user sitting in seat 120 or 130.

In one embodiment, the position of the user can be obtained through using various VSMs, such as wireless communications device 30 and/or a vehicle occupancy detector. The wireless communications device 30 can receive information, such as information from a user, that specifies a seat within the vehicle that the AR/VR device user is located. Or, the vehicle occupancy detector that is coupled to a bed of a vehicle seat can determine that only a single user is in the vehicle besides the driver and, thus, the vehicle can determine the location of the single user and AR/VR device. Or, in other embodiments, a plurality of antennas (e.g., directional antennas) can be used throughout the vehicle to obtain angle of arrival and/or angle of departure information, as well as signal strength information (e.g., relative received signal strength (RSSI)). The method 400 continues to step 440.

In step 440, the virtual vehicle skin is sent to the AR/VR device. As those skilled in the art will appreciate, the virtual vehicle skin can be digitally represented as an array of bits that can be used to represent the graphics, metadata, and other information of the virtual vehicle skin. In one embodiment, the virtual vehicle skin can be sent from the vehicle to the AR/VR device via an established SRWC connection, such as the one discussed above. The data representing the virtual vehicle skin may be larger than a packet size used in the SRWC connection and, in such a case, the virtual vehicle skin can be communicated to the AR/VR device using multiple packets. Upon receiving the packets comprising the virtual vehicle skin, the AR/VR device may then reconstruct the virtual vehicle skin.

In another embodiment, the vehicle can send virtual vehicle skin access information to the AR/VR device. This virtual vehicle skin access information can include information that enables the AR/VR device to obtain or derive the virtual vehicle skin. In one embodiment, this information can include a vehicle identifier (e.g., VIN), a virtual vehicle skin token, and/or universal resource locator (URL) (or universal resource identifier (URI)) that can be used to download the virtual vehicle skin from one or more remote servers, such as remote servers 82. For example, the virtual vehicle skin token can be generated at the time of purchasing or associating a particular virtual vehicle skin with a particular vehicle or user account (see step 330 of FIG. 4), or the virtual vehicle skin token can be generated upon receiving a virtual vehicle skin request at the remote server. The virtual vehicle skin token can be sent with a vehicle identifier (e.g., VIN) to a remote server, which can then verify the token and the vehicle identifier and, in response to the verification, the remote server can respond with the virtual vehicle skin. In some embodiments, the token and vehicle identifier can be included in the URL or URI sent to the AR/VR device. Once the virtual vehicle skin is obtained by the AR/VR device, the method 400 ends.

With reference to FIG. 6, there is shown a method 500 of presenting virtual vehicle skins over a corresponding area of a vehicle using an AR/VR device. Method 500 can be carried out by an AR/VR device, such as smartphone 14 and/or AR/VR goggles 16. The AR/VR device can include one or more digital cameras that are configured to capture images or video of an area surrounding the user, such as an area to the front of the user. For example, when the AR/VR device is worn by the user, a camera included on the AR/VR device may face an area in front of the user. The AR/VR device can then capture images or video of this area and, additionally, when the vehicle or a component of the vehicle is within the field of view of the AR/VR device camera (i.e., the "AR/VR device field of view"), the AR/VR device can present the virtual vehicle skin over the vehicle or vehicle component. And, in other embodiments, the AR/VR device can receive captured image or video data from other devices, or may receive and/or present virtual background graphics so that the user experiences a full virtual reality (VR) visual effect.

The method 500 can begin with step 510, wherein an indication that the vehicle supports virtual vehicle skins is received at the AR/VR device. In one embodiment, this indication can be a virtual vehicle skin availability message, as discussed above (step 410 of FIG. 5). As mentioned above, this can include one or more virtual vehicle skin identifiers, a service ID, or other information that can be used to indicate that virtual vehicle skins are available for use with an AR/VR device, particularly for use in overlaying graphics onto an area of the vehicle within an AR view. After this message is received, the method 500 continues to step 520.

In step 520, a virtual vehicle skin request is sent from the AR/VR device to the vehicle. This request was discussed above with respect to step 420 of method 400 (FIG. 5). As mentioned above, the request can include various information, such as the virtual vehicle skin identifier that identifies which virtual vehicle skin the AR/VR device desires to obtain. In other embodiments, a vehicle user may configure their vehicle to enable/disable certain virtual vehicle skins, which can include enabling a single virtual vehicle skin at a given time. Thus, in such a case, the virtual vehicle skin request may not specify a particular virtual vehicle skin, but may request whichever virtual vehicle skin is presently enabled to be used with AR/VR devices for augmenting the vehicle or vehicle components. The method 500 then continues to step 530.

In step 530, the virtual vehicle skin is received at the AR/VR device. The virtual vehicle skin may be embodied in various data files that can be sent using one or more messages to the vehicle and, after the files are received, the AR/VR device may then compile the files together to obtain the virtual vehicle skin. In one embodiment, the vehicle can save the virtual vehicle skin to a memory device included in the AR/VR device, and may also send a virtual vehicle skin confirmation message to the vehicle (or to the remote server) verifying that the virtual vehicle skin has been received.

As mentioned above, the virtual vehicle skin may be received from either the vehicle or a remote server. In the latter case, the AR/VR device may present a token, which can be received by the AR/VR device from the vehicle, to the remote server and, in response thereto, the remote server can send the virtual vehicle skin to the AR/VR device via land network 76 and/or cellular carrier system 70. In a particular embodiment, in response to receiving the virtual vehicle skin request, the vehicle can retrieve the requested (or determined) virtual vehicle skin from a remote server and, thereafter, the vehicle can forward the virtual vehicle skin to the AR/VR device using an SRWC connection or a wired connection. The method 500 then continues to step 540.

In step 540, the AR/VR device presents the virtual vehicle skin on the display of the AR/VR device. In many embodiments, the virtual vehicle skin is presented over images or video captured by the AR/VR device and presented in a region of the captured images or video in which the vehicle or vehicle components reside. The AR/VR device can use various augmented reality techniques to present the virtual vehicle skin on the display in a proper manner. In one embodiment, the virtual vehicle skin can include numerous graphics that comprise the virtual vehicle skin. Each of these graphics can be associated with a particular component or area of the vehicle.

In one embodiment, the virtual vehicle skin can include a plurality of virtual vehicle skin components, each of which corresponds to a particular area or component of the vehicle. For example, with reference to FIG. 3, there is shown various vehicle components, including seats 120,130, A-pillars 140,142, and various trim components around center console 106 and shifter 112. Virtual vehicle skin components 150-160 can be presented over these components and, in some embodiments, AR/VR device can use image processing and/or object recognition techniques, as well as other augmented reality (AR) techniques, to identify a vehicle component, along with one or more attributes of the vehicle component or the AR/VR device field of view. These virtual vehicle skin components 150-160 can then be presented based on this information. For example, the AR/VR device can identify a position and size of the driver seat 120, as well as viewing angle of the AR/VR device. Then, using this information, the AR/VR device can then determined a position and size of the virtual vehicle component 156, which can be the same or at least based on the position and size of the seat 120. The AR/VR device can then render these graphics 156 in this determined region. Moreover, the viewing angle of the AR/VR device can also be used as a basis for transforming and/or distorting the virtual vehicle component 156 so that it appears natural to the user.

In one embodiment, the AR/VR device can use an accelerometer, as well as radio communications with the vehicle, to determine a position, orientation, and/or viewing angle of the AR/VR device within the vehicle. Additionally, or alternatively, the AR/VR device can use image processing techniques to recognize certain objects within the field of view of the AR/VR device camera to corroborate the location and/or orientation of the AR/VR device within the vehicle. For example, the vehicle interior may contain certain attributes or components (i.e., "virtual vehicle skin markers") that are readily recognizable through use of image processing techniques. Information concerning these virtual vehicle skin markers can be included in the virtual vehicle skin data and used to inform the AR/VR device of where the various virtual vehicle skin components are to be displayed. Based on the component information included as part of the virtual vehicle skin, the AR/VR device can position the various virtual vehicle skin components within the display so that the AR components correspond to the components within the vehicle. For example, the AR/VR device can determine a position within the video output (which is to be displayed on the display of the AR/VR device) that a particular component should be located and, thereafter, the AR/VR device can then include the AR component at the determined location within the video output. The video output may include real-life video or images that are gathered by a camera on the AR/VR device, as well as any virtual vehicle skin components that may be rendered thereon. Moreover, as the AR/VR device is repositioned or reoriented, the AR/VR device can update the video output to reflect an augmented reality (AR) output that corresponds to the new field of view of the AR/VR device.

In other embodiments, the virtual vehicle skin can include virtual exterior environment graphics that can be used to add additional visual effects to areas outside the vehicle and normally visible through a window. For example, the vehicle can include virtual exterior environment graphics as a part of the virtual vehicle skin and, then, the AR/VR device can: determine exterior areas within the field of view of the AR/VR device; and, then, render the virtual exterior environment graphics within these regions so that the user of the AR/VR device experiences a visual effect of being in a different or modified environment. For example, the virtual exterior environment graphics can depict outer space so that the vehicle appears to be traveling in outer space. In one embodiment, the regions outside the vehicle can be entirely virtual graphics—that is, none of the captured images or video of these exterior regions are retained for viewing on the display of the AR/VR device. The method 500 then ends.

In one embodiment, the method 300, the method 400, and/or the method 500 (or parts of these various methods) can be implemented in a computer program (or "application") embodied in a computer readable medium and including instructions usable by one or more processors of one or more computers of one or more systems. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media (such as memory that is a part of the remote servers 82 (method 300), memory 38 (method 400), memory on the AR/VR device (method 500)), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method of configuring an augmented reality/virtual reality (AR/VR) device to augment image or video data using a virtual vehicle skin, the method comprising:
   capturing image or video data using a camera included on the AR/VR device;
   receiving a virtual vehicle skin availability message from a vehicle, wherein the vehicle uses a wireless communications device to periodically broadcast the virtual vehicle skin availability message, and wherein the virtual vehicle skin availability message indicates that virtual vehicle skins are available for supplementing or augmenting a view of the vehicle;
   in response to receiving the virtual vehicle skin availability message, sending a virtual vehicle skin request, wherein the virtual vehicle skin request is a request from the AR/VR device to obtain the virtual vehicle skin; and
   receiving a virtual vehicle skin response, wherein the virtual vehicle skin response includes a digital representation of the virtual vehicle skin or information that can be used by the AR/VR device to obtain the digital representation of the virtual vehicle skin, and wherein the virtual vehicle skin is associated with the vehicle as a result of a virtual vehicle skin association request that is received from a user and that indicates that the user desires to have the virtual vehicle skin associated with the vehicle.

2. The method of claim 1, wherein the virtual vehicle skin request is sent to the vehicle, and wherein the virtual vehicle skin response is sent by the vehicle.

3. The method of claim 2, wherein the virtual vehicle skin response includes virtual vehicle skin access information, and wherein the method further comprises the steps of:
   sending a second virtual vehicle skin request to a remote server using the virtual vehicle skin access information; and
   receiving a second virtual vehicle skin response that includes the digital representation of the virtual vehicle skin.

4. The method of claim 1, wherein the virtual vehicle skin includes a plurality of virtual vehicle skin components, and wherein the method further comprises the steps of:
   determining to display at least one virtual vehicle skin component of the plurality of virtual vehicle skin components based on the image or video data; and
   rendering at least part of the at least one virtual vehicle skin component on a display of the AR/VR device.

5. The method of claim 4, further comprising the step of, before rendering the at least part of the at least one virtual vehicle skin component on the display of the AR/VR device, modifying the at least one virtual vehicle skin component based on the captured image or video data.

6. The method of claim 1, wherein the virtual vehicle skin includes virtual exterior environment graphics, and wherein the method further comprises the steps of:
   determining exterior areas that are exterior to the vehicle and within the captured image or video data; and
   rendering the virtual exterior environment graphics within the exterior areas.

7. The method of claim 1, further comprising the step of determining an orientation of the AR/VR device using an accelerometer included on the AR/VR device.

8. The method of claim 1, wherein the vehicle is configured to determine a position of the AR/VR device within the vehicle and, thereafter, to obtain the virtual vehicle skin based on the position of the AR/VR device.

* * * * *